Sept. 27, 1960 D. W. UNDERHILL 2,953,955

COMPACT ADJUSTABLE LENGTH TUBING CUTTER

Filed Jan. 14, 1957

DENTON W. UNDERHILL,
INVENTOR.

BY Thomas P. Maloney
ATTORNEY.

United States Patent Office 2,953,955
Patented Sept. 27, 1960

2,953,955

COMPACT ADJUSTABLE LENGTH TUBING CUTTER

Denton W. Underhill, 2054 W. Mountain St., Glendale, Calif.

Filed Jan. 14, 1957, Ser. No. 634,031
1 Claim. (Cl. 83—355)

This invention relates to a tubing cutter and, more particularly, to a device which is adapted to cut an elongated body such as a tubing into a plurality of sections of predetermined length.

My invention has particular applicability to the cutting of hollow, plastic tubing utilized in the electrical and electronic arts and popularly known to those skilled in the art as "spaghetti." The tubing is customarily cut into relatively short lengths for use in insulating connections and junctions in electrical circuits and it is frequently necessary to provide larger quantities of different lengths of tubing.

To accomplish the cutting of such different lengths of tubing, prior art devices have been provided which are characterized by both complexity of construction and resultingly high cost.

It is, therefore, an object of my invention to provide a tubing cutter which is extremely simple in construction and which, because of said extreme simplicity of construction, can be manufactured and sold at a relatively low price.

Another object of my invention is the provision of a tubing cutter including a rotatable cutting blade and a feed wheel which is operatively connected to the drive means for the cutting blade through a reciprocating connection whereby said feed wheel is rotated to cause advancement of the tubing to be cut to the cutting blade of the tubing cutter.

Another object of my invention is the provision of a tubing cutter of the aforementioned character wherein the operative connection between the tubing feed wheel and the drive means for the cutter blade is constituted by a rotatable cam engageable with a parallelogram connection which, in turn, drives a rack and pinion to cause rotation of the aforementioned feed wheel.

An additional object of my invention is the provision of a tubing cutter of the aforementioned character wherein a unidirectional overrunning clutch is interposed between the feed wheel and the pinion of the rack and pinion connection to accomplish unidirectional rotation of the feed wheel in one direction in order that the tubing may be advanced in only said direction to the cutter blade.

Another object of my invention is the provision of adjustment means in the connection between the drive shaft of the cutter blade and the feed wheel for the tubing whereby the length of stroke imparted by the parallelogram connection to the rack and thus from the rack through the pinion to the feed wheel can be controlled and thus the extent to which the tubing is advanced through the cutter blade may be adjusted.

A further object of my invention is the provision of a tubing cutter of the aforementioned character which is capable of cutting large quantities of tubing in relatively small intervals of time and which is constituted by a small number of simple component parts.

Other objects and advantages of my invention will be apparent from the following specification and the accompanying drawing which is for the purpose of illustration only and in which.

Figures 1, 2, 3, 4, 5:
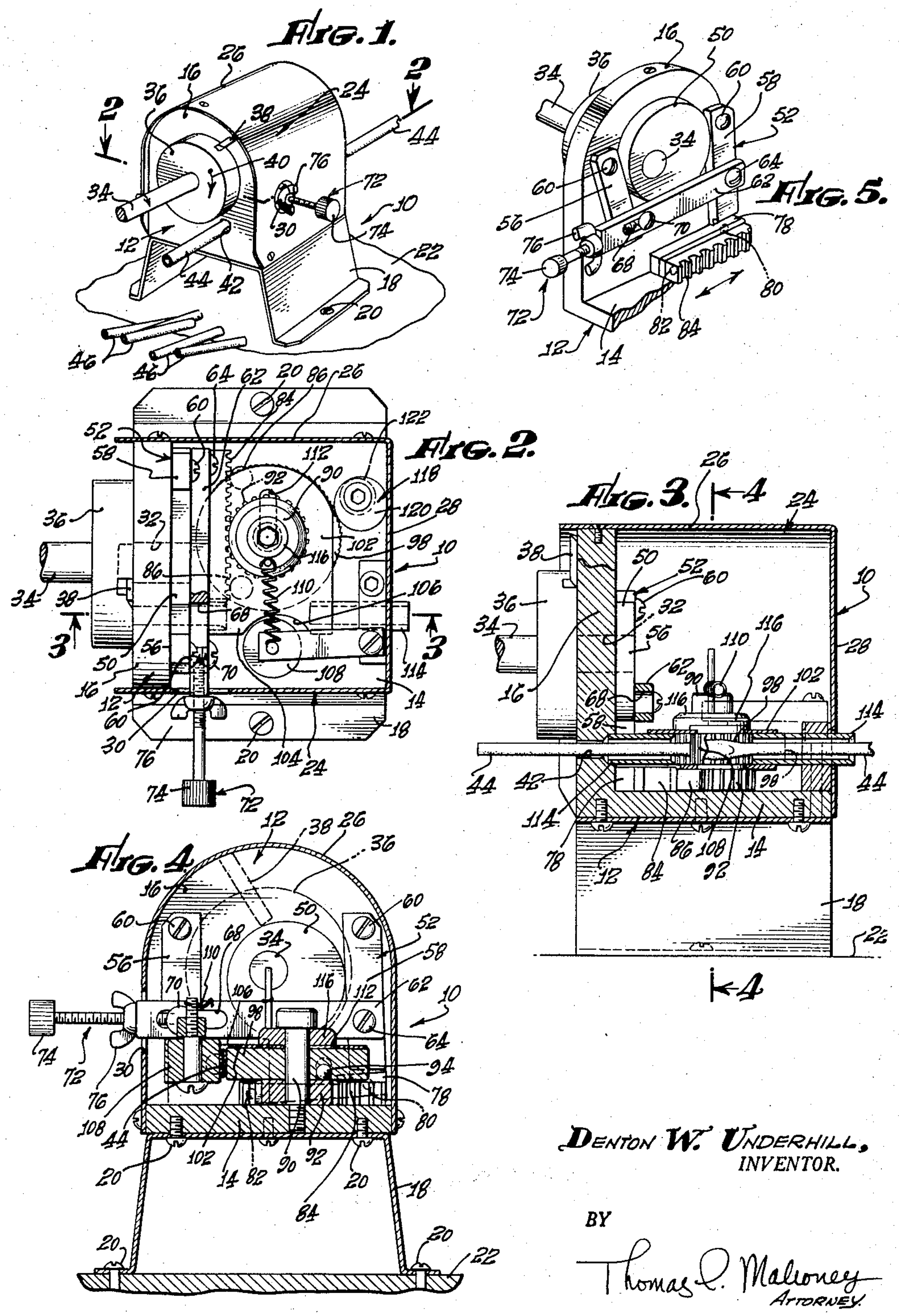
Fig. 1 is a perspective view showing a tubing cutter constructed in accordance with the teachings of my invention.
Fig. 2 is a transverse, sectional view taken on the broken line 2—2 of Fig. 1.
Fig. 3 is a transverse, sectional view taken on the broken line 3—3 of Fig. 2.
Fig. 4 is a vertical, sectional view taken on the broken line 4—4 of Fig. 3.
Fig. 5 is a side elevational view of a portion of the driving connection between the drive shaft of the cutter blade and the feed wheel for the tubing.

Referring to the drawing and particularly to Figs 1–3 thereof, I show a tubing cutter 10 constructed in accordance with the teachings of my invention and including a right-angularly formed mounting frame 12 which, as best shown in Figs. 3 and 5 of the drawing, includes a bed plate 14 and a side plate 16. Secured to the underside of the bed plate 14 is a sheet metal supporting bracket 18 which is maintained in operative relationship with the bed plate 14 by means of screws 20.

The supporting bracket 18 can be attached, as best shown in Fig. 4 of the drawing, to a suitable surface 22 to facilitate the operation of the same. A sheet metal enclosure 24 is provided to house the operative parts of the tubing cutter 10 and includes a substantially semi-circular side wall 26 and a rear wall 28.

A circular opening 30 is provided in the side wall 26 of the sheet metal enclosure 24, for a purpose which will be described in greater detail below.

A horizontally oriented bore 32 is formed in the side plate 16 of the mounting frame 12 for the reception of a drive shaft 34 which can be driven by a handle and crank affixed thereto or by a suitable motor, not shown. Mounted upon the periphery of the drive shaft 34 and secured thereto for rotation thereby is a disc 36 which serves as a mount for a cutter blade 38.

Rotation of the drive shaft 34 causes concomitant rotation of the disc 36 and thus rotation of the cutter blade 38 which is in a clockwise direction, as best shown by the arrow 40 in Fig. 1 of the drawing, and which causes the cutter blade 38 to be carried over an opening or orifice 42 provided in the side plate 16 of the mounting frame 12 whereby tubing 44 can be advanced into the path of rotation of the cutter blade 38 to be cut into a plurality of sections 46 of equal length, as best shown in Fig. 1 of the drawing.

The drive shaft 34 extends through the horizontally oriented bore 32 in the side plate 16 and has mounted upon the inner extremity thereof a rotatable cam or eccentric disc 50 which bears upon the inner surface of the side plate 16 and is rotatable concomitantly with the rotation of the cutter blade 38 by the drive shaft 34. The cam 50 is disposed in operative relationship with a connection 52, as best shown in Figs. 3–5 of the drawing. The connection 52 includes a pair of substantially parallel arms 56 and 58 which are pivotally mounted for movement with respect to the inner surface of the side plate 16 and which are pivotally supported by means of screws 60.

The lower extremities of the arms 56 and 58 are operatively connected by means of a transversely oriented bar 62 whose right-hand extremity is, as best shown in Figs. 2–5 of the drawing, connected to the arm 58 by means of a screw 64, while the left-hand extremity thereof is provided with an elongated slot 68 for the reception of the shank of a screw 70. Mounted in the left-hand extremity of the transversely oriented bar 62 is an adjustment means 72 constituted by an adjustment screw 74 having its inner extremity projectible into the elongated slot 68 and engageable with the shank of the screw 70.

The rotation of the adjustment screw 74 of the adjustment means 72 in one direction will cause the inner extremity of said screw to advance into the slot 68 in the transverse bar 62 to engage the shank of the screw 70 and to urge the arm 56 to the right, as viewed in Figs. 4 and 5 of the drawing, into closer proximity to the axis of rotation of the cam 50. Therefore, when the cam 50 is rotated to bring the lube thereof into engagement with the arm 56, the arm 56 will be displaced to the left a distance which is greater as the penetration of the inner extremity of the adjustment screw 74 into the slot 68 is increased.

Conversely, when the adjustment screw is rotated to cause the inner extremity thereof to adopt a position close to the lefthand end of the slot 68, as viewed in Figs. 4 and 5 of the drawing, the arm 56 is permitted to assume a position more widely spaced from the lobe of the cam 50 and thus when the lobe is rotated into engagement with the arm 56 it will be displaced to the left a correspondingly smaller extent, thus reducing the extent to which the arm 58 is displaced by means of the transverse bar 62 connected between the arms 56 and 58. It will be noted that the adjustment screw 74 projects through the opening 30 in the enclosure 24 and that there is mounted upon the shank thereof a lock nut 76 which serves to maintain the adjustment screw 74 in a predetermined position of adjustment. Thus, in a manner to be described in greater detail below, the adjustment screw 74 can be adjusted to determine the length of a section 46 of tubing 44 to be advanced during rotation of the cam 50 from the exterior of the enclosure with a minimum of effort.

The lowermost end of the arm 58 is pivotally connected to a link 78 by means of a pivot pin 80 and the opposite end of the link 78 is pivotally connected by means of a pivot pin 82 to a rack 84 which is adapted to slide upon the bed plate 14 of the mounting frame 12.

A pair of guide rollers 86 is secured to the bed to guide the rack 84 in its movement by the link 78.

A vertically oriented shaft 90 is threadedly mounted in the bed plate 14 of the mounting frame 12 and a rack engaging pinion 92 is mounted for rotation thereupon, said rotation being induced by reciprocation of the rack 84 through the medium of the parallelogram connection 52 as energized by the rotation of the cam 50.

Superimposed upon the piston 92 and operatively connected thereto by means of a unidirectional clutch 94 is a feed wheel 98 having a serrated periphery which is engageable, as best shown in Fig. 3 of the drawing, with a tubing 44 disposed in operative releationship therewith.

A retainer plate 102 is disposed in overlying relationship with the feed wheel 98 and is provided with a tube guiding portion 104 which is arcuately cut out at 106, as best shown in Fig. 2 of the drawing, to permit a back-up roller 108 to be urged against the periphery of the tubing 44 by means of a tension spring 110. The back-up plate 102 is provided with an elongated slot 112 which permits the adjustment of the same with respect to oppositely disposed tubing guides 114 which serve, in conjunction with the tubing guiding portion 104 of the plate 102, to guide the tubing 44 past the feed wheel 98 and the back-up roller 108.

A cap 116 maintains all of the elements disposed upon the shaft 90 in operative relationship therewith.

Mounted adjacent the periphery of the feed wheel 98 and operatively engaging the same is a brake 118 constituted by an eccentric 120 which is biased inwardly into engagement with the periphery of the feed wheel 98 by means of a torsion spring 122.

Operation of the tubing cutter 10 of my invention is initiated by rotation of the drive shaft 34 which causes concomitant rotation of the disc 36 mounting the cutter blade 38. As the drive shaft 34 rotates, the cam 50 is correspondingly rotated to urge the lobe on said cam into engagement with the arm 58 to cause said arm to be rotated in a counterclockwise direction to draw the link 78 and the associated rack 84 to the right, as best shown in Fig. 5 of the drawing. When such right-hand movement of the rack 84 is accomplished, corresponding rotation of the pinion 92 and the feed wheel 98 takes place to advance the tubing 44 to an extent determined by the adjustment of the adjustment screw 74 incorporated in the adjustment means 72.

Thus, if the adjustment screw 74 extends a substantially great distance into the slot 68 in the transverse connecting bar 62, the rack 84 will have been positioned, in a manner to be described in greater detail below, for a stroke of greater length and thus for a greater rotation of the pinion 92 and the associated feed wheel 98. On the other hand, if the inner extremity of the adjustment screw 74 does not project a substantial distance into the slot 68 of the connecting bar 62, the stroke of the rack 84 and corresponding rotation of the pinion 92 and the associated feed wheel 98 will be reduced.

Of course, the advancement of the tubing 44 takes place during movement of the feed wheel 98 by the pinion 92 as accomplished by the associated rack 84 and after the cam 50 has been rotated out of engagement with the arm 58, it will rotate freely until the cutter blade 38 moves downwardly to cut off the projecting length of tubing 44 that projects through the opening 42 in the side plate 16 of the mounting frame 12. Thus, a shearing action is obtained between the cutter blade 38 and the edge of the opening 42 which accomplishes a clean cutting of the tubing 44 into sections 46 of the desired length. As the cutter blade 38 passes the opening 42, the lobe on the cam 50 will engage the arm 56 to draw the rack 84 to the left, as seen as Fig. 5 of the drawing, and it is apparent that the adjustment means 72 will determine how far and to what extent the rack 84 is drawn to the left by the cam 50 and thus determine what the stroke of the rack will be when it is moved to the right by the engagement of the lobe of the cam 50 with the arm 58.

Obviously, as the rack 84 is moved to the left by the action of the cam 50, the pinion 92 is rotated in a direction which would cause reverse rotation of the feed wheel 98 which is, of course, undesirable because it would accomplish retraction of the tubing 44 from the orifice 42 in the side plate 16. In this condition, the unidirectional, overrunning clutch 94 severs the operative connection between the pinion 92 and the feed wheel 98, thus permitting reverse rotation of the pinion 92 by the rack 84 without reversely rotating the feed wheel 98. At this juncture, the brake 118 also comes into play in that it prevents the possibility of the frictional contact between the pinion 92 and the feed wheel 98 causing rotation of said feed wheel and possible dislodgement of the tubing 44 biased thereagainst by the operation of the back-up roller 108.

I thus provide by my invention a tubing cutter which is characterized by its simplicity of construction and operation and the reasonable cost thereof. It will be noted that the adjustment screw 74 projects through the opening 30 in the housing to facilitate easy adjustment of the tubing cutter to accomplish the severance of sections of different lengths of tubing and there is no complexity of involvement in the adjustment of the cutter.

I claim as my invention:

In a feeding mechanism for longitudinally translating an elongated body to a cutter adapted to sever predetermined lengths from said body, the combination of: a housing having an end wall incorporating an outlet orifice therein for the passage of said body and for co-operation with said cutter; a drive shaft mounted for rotation in said end wall adjacent said outlet orifice; a rotatable carrier for said cutter mounted on said drive shaft adjacent said end wall, said cutter projecting radially from said carrier and having a substantially radial shearing edge which co-operates in shearing relation with said orifice; a cam mounted for rotation on said drive shaft on the other side of said wall from said carrier; a linkage mounted on said end wall in juxtaposition to said cam, said linkage including a pair of pivotally mounted arms secured to said end wall on opposite sides of said cam and a link connecting said arms whereby rotation of said cam will cause concomitant pivotal movement of said arms; a rack pivotally connected to one of said arms and longitudinally movable thereby in juxtaposition to said end wall; a pinion engaged by said rack; a drive wheel connected to said pinion by a one-way clutch mechanism; and a back-up wheel juxtaposed to said drive wheel and biased into engagement with said body when it is located between said drive wheel and said back-up wheel whereby said body is intermittently fed through said orifice.

References Cited in the file of this patent

UNITED STATES PATENTS

| | | |
|---|---|---|
| 617,253 | Manville et al. | Jan. 3, 1899 |
| 1,856,027 | Clouse | Apr. 26, 1932 |
| 2,520,286 | Pietsch | Aug. 29, 1950 |